United States Patent [19]

Borgford

[11] Patent Number: 5,542,326
[45] Date of Patent: Aug. 6, 1996

[54] BALE CUTTING DEVICE

[76] Inventor: Benjamin J. Borgford, P.O. Box 459, Arborg, Manitoba, Canada, R0C 0A0

[21] Appl. No.: 371,374

[22] Filed: Jan. 11, 1995

[51] Int. Cl.$^6$ ..................................................... B23D 57/02
[52] U.S. Cl. ............................ 83/795; 83/928; 30/379.5; 241/605
[58] Field of Search ........................... 30/379, 379.5; 83/928, 574, 830, 833, 795; 241/605

[56] References Cited

U.S. PATENT DOCUMENTS

| | | | |
|---|---|---|---|
| 2,698,035 | 12/1954 | Smith, Jr. .................................. | 83/795 |
| 3,078,886 | 2/1963 | Childress .................................. | 83/795 |
| 4,771,670 | 9/1988 | Woerman ................................. | 30/379.5 |
| 4,850,409 | 7/1989 | Roberson ................................. | 83/928 |
| 4,903,562 | 2/1990 | Wunder et al. .......................... | 83/833 |
| 5,161,448 | 11/1992 | Wangsness ............................. | 83/928 |
| 5,242,121 | 9/1993 | Neier ....................................... | 83/795 |
| 5,277,091 | 1/1994 | Borgford ................................. | 83/830 |

Primary Examiner—Rinaldi I. Rada
Assistant Examiner—Allan M. Schrock
Attorney, Agent, or Firm—Adrian D. Battison; Murray E. Thrift

[57] ABSTRACT

An apparatus for cutting baled crop materials particularly of the cylindrical bale type comprises an apparatus in the form of a conventional chain saw in which the chain is modified so that either the slide links or the guide links include an outwardly projecting cutting plate. The cutting plate is shaped to form a cutting edge having a ramp shape commencing at a position intersecting the previous link and extending outwardly at a gradual inclination of the order of 20° to an outermost point and then a trailing edge which extends backwardly toward the main body of the chain. The width of the cutting plate is less than the width of the chain itself in view of the tension in the bale which pulls the bale apart as it is cut.

5 Claims, 9 Drawing Sheets

5,542,326

BALE CUTTING DEVICE

BACKGROUND OF THE INVENTION

This application is an improvement on my prior U.S. Pat. No. 5,277,091, issued Jan. 11th, 1994, in which some of the subject matter disclosed herein is patented.

This invention relates to a bale cutting device for cutting baled crop material of the type having elongate elements formed into the bale so that elongate elements lie generally parallel.

The baling of crop materials particular hay or forage crops for consumption subsequently by animals has in recent years used almost exclusively the large round bale type system. In this system a cylindrical bale is formed which can be four to six feet in diameter and approximately the same in axial length. These bales are convenient for handling and the baling systems are relatively simple and straightforward.

Often for livestock kept outdoors the bale is simply deposited on the ground often surrounded by a bale feeder so that the animals can take directly from the baled material and themselves dismantle the bale.

In some cases this technique is not suitable particularly when the animals are housed and restrained. In this situation it is often desirable for the bale to be broken up so that it can be fed in separate portions to different animals.

Rectangular bales are relatively easy to break up since they are formed with the elongate elements of the crop material parallel so that the bales can simply break at a transverse plane since all the elements lie parallel to that plane.

Cylindrical bales however are very difficult to break since the elongate elements are wrapped around the axis.

Various shredding machines have been developed in which the bale is introduced into a hopper or the like and then it is abraded by rotating flails which rip the bale into small parts and ejected through a suitable duct. However these machines are expensive and have other disadvantages.

A bale slicing machine is shown in U.S. Pat. No. 3,618,649 (Benno) which includes a hopper into which the material is dropped in the bale formed together with a pair of cutting chains which extend transversely to the bale and provide a cutting action. The details of the chains are not shown but the teeth of the chains appear to be of the type conventionally used on chain saws.

U.S. Pat. 3,871,255 (Nisula) discloses a device for cutting peat band rolls which apparently comprises an arrangement having an endless chain but again the details of the chain are not shown.

Other chain cutting devices are provided for example as shown in U.S. Pat. Nos. 2,488,886 (Young), 3,006,126 (Viverette) and 4,164,835 (Conte) in which the chain carries outwardly projecting cutting blades which cooperate with stationary fingers on a sickle-knife cutting action. However none of these cutting devices are suitable for cutting bales in view of the presence of the cutting fingers and in view of the fact that the cutting edges on the chain are designed in a manner which renders them suitable for cutting with the stationary fingers but completely unsuitable for cutting a bale.

SUMMARY OF THE INVENTION

It is one object of the present invention, therefore, to provide an apparatus and method for cutting baled crop materials of the type having longitudinal crop elements.

According to a first aspect of the invention there is provided an apparatus for an apparatus for cutting a cylindrical bale of a forage material comprising a bale fork assembly including a mounting frame, a pair of bale forks extending forwardly from the mounting frame adjacent a bottom portion thereof for engaging under a bale, an upstanding support structure positioned generally between the bale forks and extending upwardly therefrom, a cutting chain assembly including a continuous chain, means for driving the chain, means mounting the cutting chain on the upstanding support assembly at a position above and between the bale forks and means for moving the cutting chain in a vertical plane between the forks so as to effect cutting of the bale sitting on the forks One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
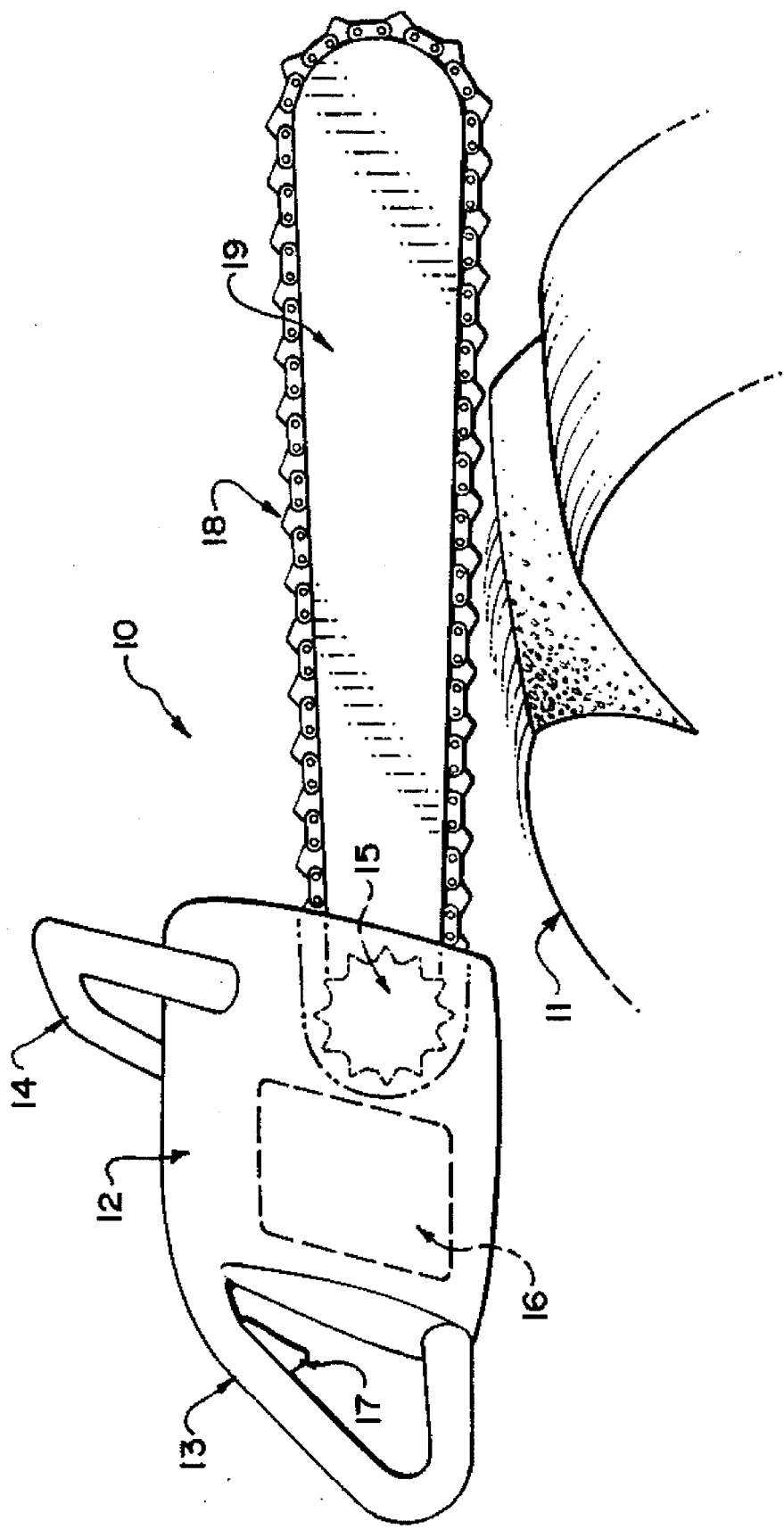
FIG. 1 is an isometric view of a cutting apparatus according to the present invention in operation.

The cutting apparatus is generally indicated in FIG. 1 at reference numeral 10 and is shown operating upon a bale shown schematically at 11.

The cutting apparatus is similar to a conventional chain saw in that it includes a housing 12 having a first handle 13 and a second handle 14 by which the housing can be grasped and manually moved from place to place in a cutting action. The housing includes a sprocket 15 which is mounted within the housing on a suitable transverse axle allowing the sprocket to rotate about its axis to drive the chain. The sprocket is driven by a motor schematically indicated at 16 which is operated by a trigger 17 carried on the handle 13. The operator can thus grasp the handle 13 with one hand, the handle 14 with the opposed hand and can operate the trigger 17 to rotate the sprocket thus driving the chain in a conventional action. The chain is shown schematically in FIG. 1 and comprises an endless chain 18 which is wrapped around a support plate 19 carried on the housing and projecting outwardly therefrom so that the plate is normally vertical when the housing is suspended from the handle 14. The chain is wrapped around the plate in a guide track shown in more detail hereinafter.

Figure 2:
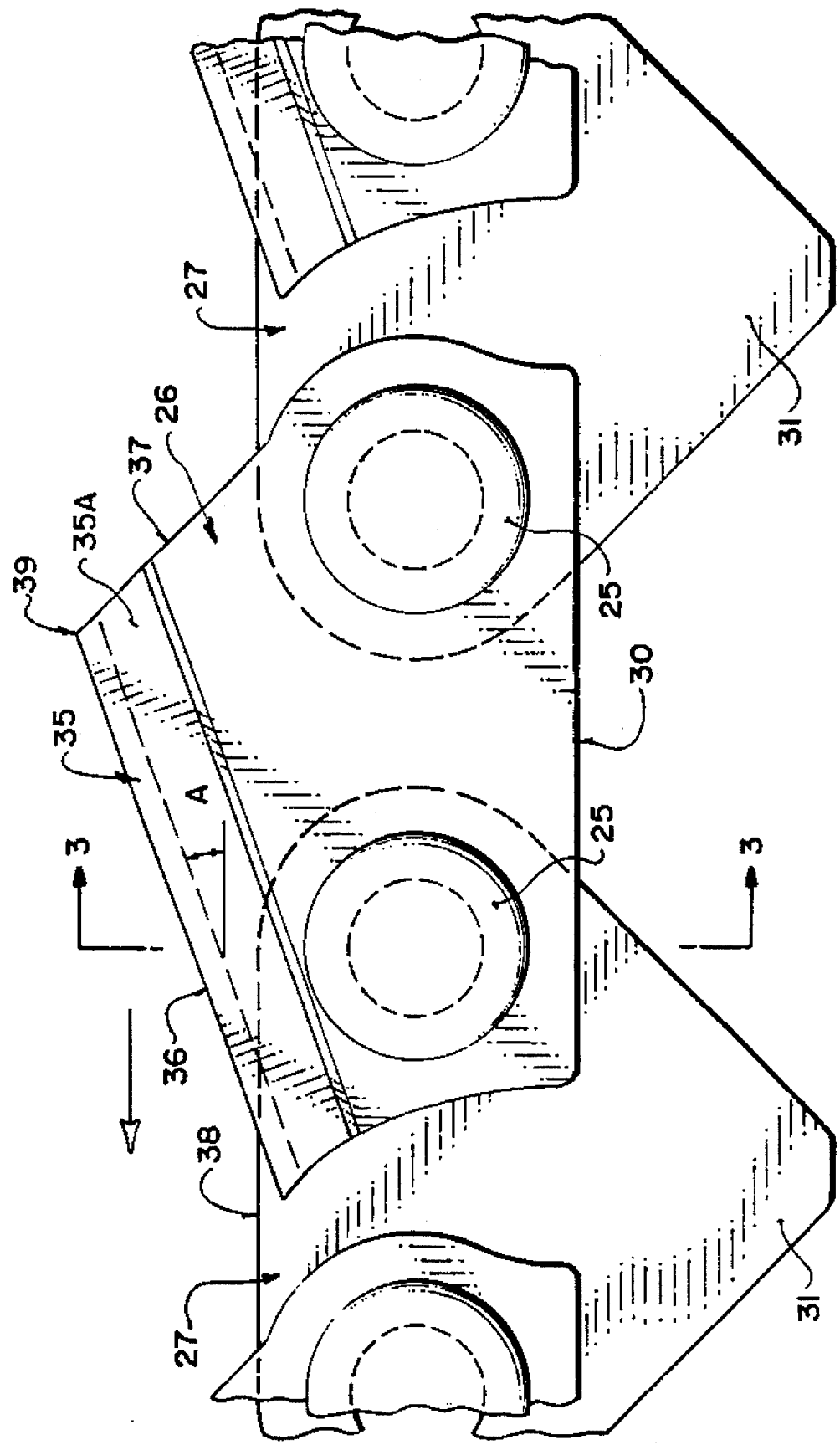
FIG. 2 is a side elevational view of one embodiment of the cutting chain used with the apparatus of FIG. 1.
Figure 3:
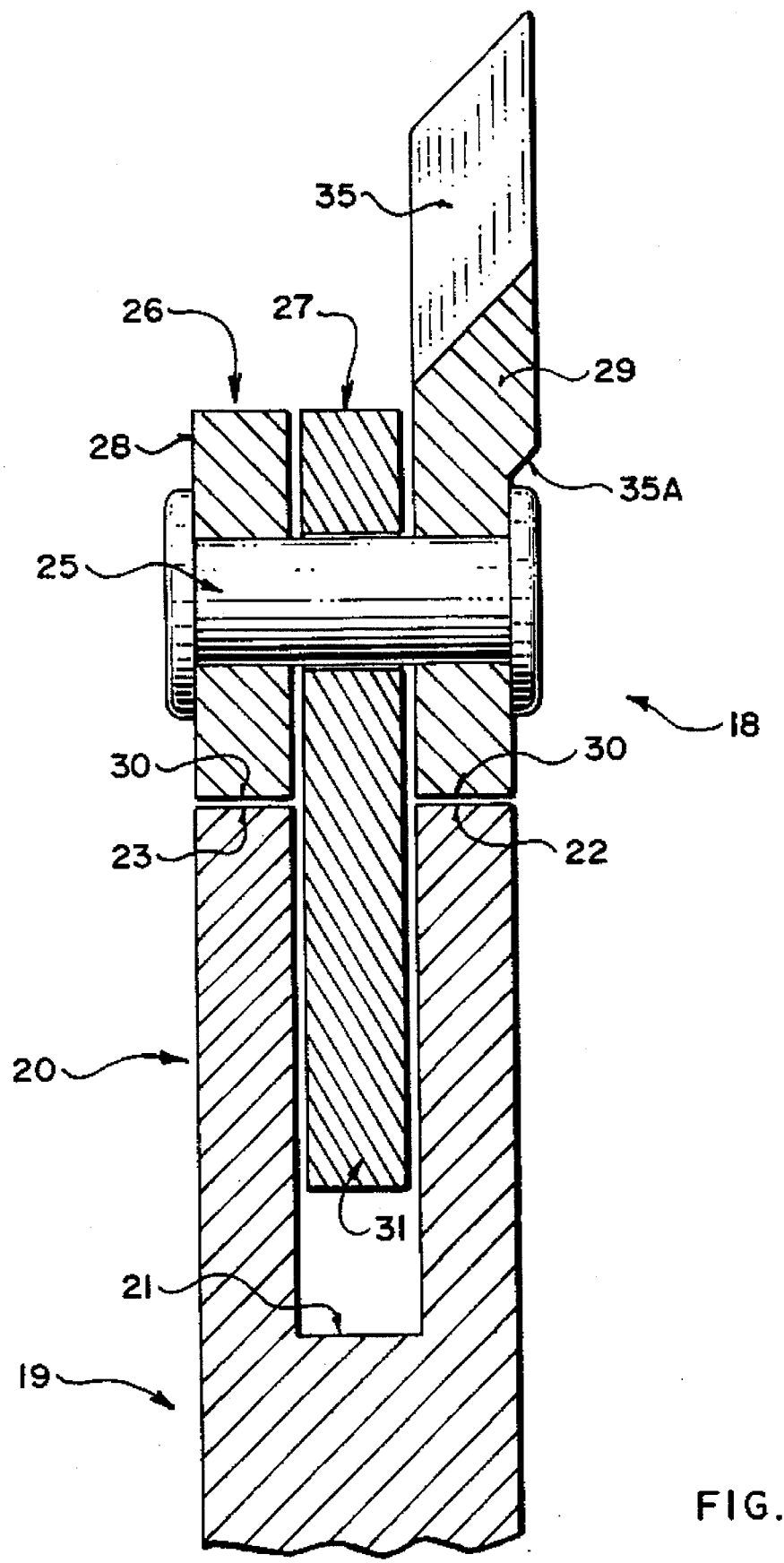
FIG. 3 is a cross sectional view along the lines 3—3 of FIG. 2.

Turning now to FIGS. 2 and 3, an edge of the plate 19 is shown in FIG. 3 wherein the guide track is indicated at 20. The guide track includes a recess 21 which is positioned between two outward raised edge surfaces 22 and 23 of the plate. The raised surfaces 22 and 23 act as sliding surfaces whereas the recess 21 therebetween acts as a guide. The chain comprises a plurality of link pins 25 which connect together alternately slide links 26 and guide links 27. The sliding links 26 comprise two parallel plates 28 and 29 mounted on the pins 25 and spaced by the guide link 27. The parallel plates 28 and 29 have a flat undersurface 30 which slides on a respective one of the sliding surfaces 22 and 23. The guide links 27 include a fin 31 which extends downwardly below the surfaces 30 into the recess 21 so as to guide the chain as it slides along the guide track to hold the bottom surfaces 30 in contact with the sliding surfaces 22 and 23.

One of the plates of the sliding links in this case the plate 29 is modified by the addition of a cutting plate 35 which projects outwardly from the outer edge of the plate 28 and the outer edge of the guide link 27. The cutting plate 35 includes a cutting edge 36 and a trailing edge 37. The cutting edge defines a ramp surface which extends from a point at or below the outermost surface 38 of the guide link 27 upwardly and outwardly away from the outer edge of the plate to a point 39 of maximum distance from the plate at which the cutting edge 36 intersects with the trailing edge 37 which is then inclined downwardly and rearwardly back toward the link 27. The angle of inclination indicated at A of the cutting edge relative to the side edge of the plate that is parallel to the edge 30 of the link is preferably of the order of 20° as illustrated but can lie between 10° and 45° and more preferably between 10° and 30°. This shallow angle of the cutting edge provides a ramp surface with no returns or notches or other elements which could abut or contact a portion of the crop material to be cut. The only object that the crop material can contact above the chain is the edge 36 which is a cutting edge so that there is necessarily a cutting action on all the crop material contacted without the possibility of it being grasped and pulled.

As shown in FIG. 3 the cutting plate 35 has a width narrower than the width of the chain as defined by the length of the pin 25. The cutting plate is formed so that it projects outwardly as indicated at 35A over the head of the pin 25 on the side of the cutting plate so as to yet further prevent material from being grasped by the head of the pin. The chain on that side of the cutting plate therefore provides a relatively smooth surface.

In the cutting action shown in FIG. 1, a cutting zone of the plate 19 is brought toward the bale that is at the underside of the plate at which time the chain and particularly the cutting plates 35 engage the bale in a cutting action. In this cutting zone the plate is entirely free from stationary fingers or other cutting edges which cooperate with the chain so that the only cutting action is provided by the chain.

During the cutting action the tension in the bale once the crop material is cut tends to pull the crop material apart. There is no necessity therefore for the chain to attempt in any way to cut a width in the crop material to allow it to pass through since the crop material automatically spreads and allows the remainder of the chain and the plate to pass through into the cut section.

Figure 4:
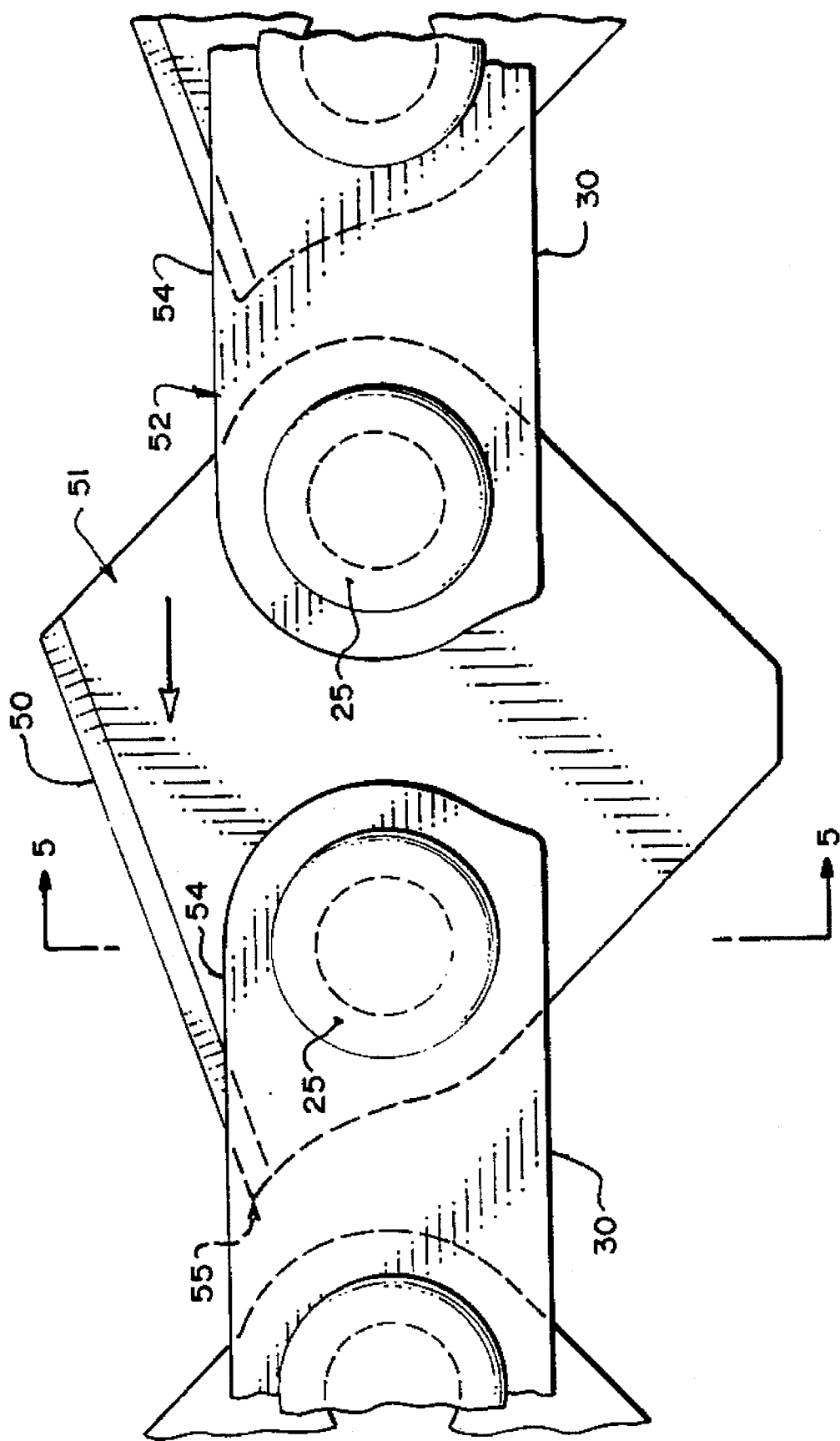
FIG. 4 is a side elevational view of a second embodiment of a chain for use with the apparatus of FIG. 1.
Figure 5:
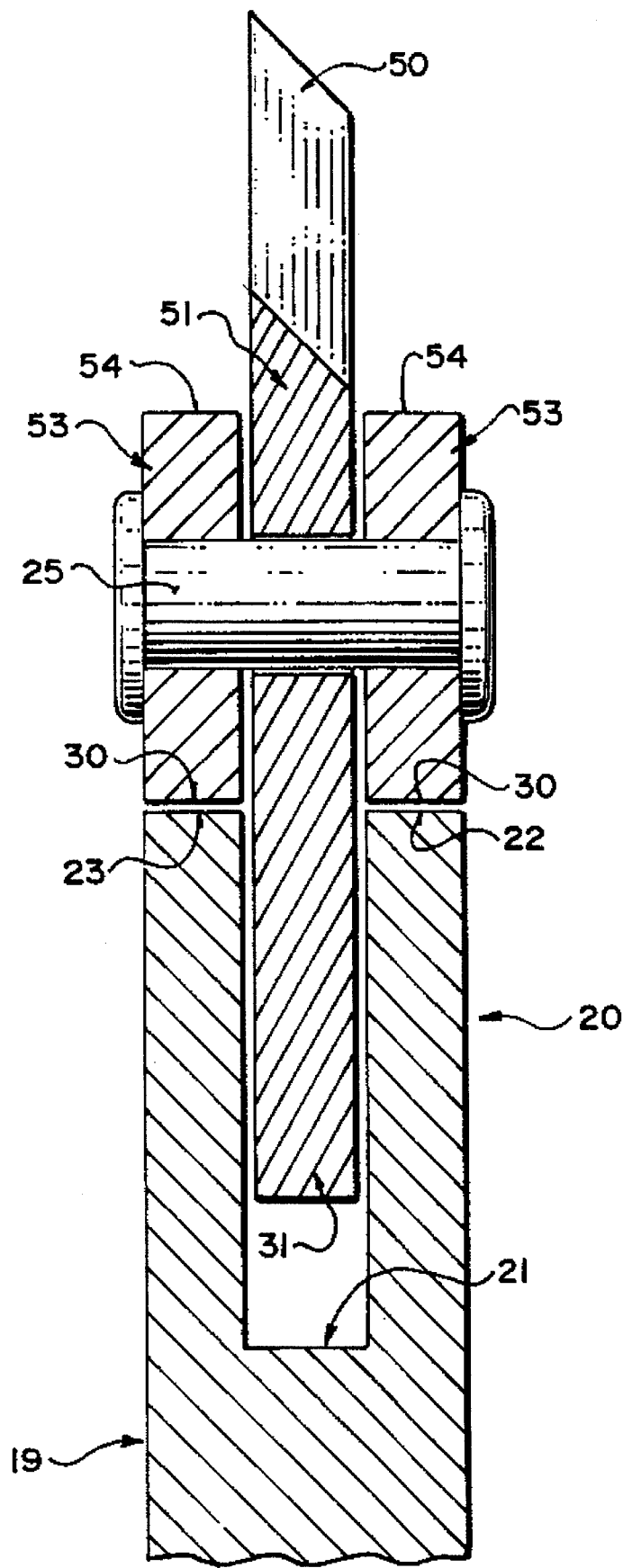
FIG. 5 is a cross sectional view along the lines 5—5 of FIG. 4.

Turning now to FIGS. 4 and 5, an alternative arrangement is shown in which the cutting edge is indicated at 50 and is provided on the guide link 51. Thus the chain is substantially as previously described mounted within the track including the slide edges 22 and 23 and the recess 21. In this case, however, the slide link 52 simply comprises a pair of parallel plates 53 spaced either side of the central guide link. The plates 53 thus have bottom surfaces 30 as previously described together with parallel upper surfaces 54 which take no part in the cutting action. In this arrangement the edge 50 is shaped similarly to the cutting edge 35 and operates in the same manner. The cutting edge commences at a position intersecting with the upper edge 54 so that there is no possibility of crop material becomming wedged underneath the cutting edge 50 and between the cutting edge 50 and the top edge 54. For this purpose the guide link is formed so that it extends forwardly to a point 55 forward of the normal extent of a link of this type to allow the edge 50 to intersect with the surface 54 and yet have the required shallow angle of the order of 20°.

In a situation where the baled crop material does not spring apart when cut to allow the chain and guide plate to pass through, the chain can be modified so that the sliding links, of the type shown in FIG. 3, have cutting plates on the left and righthand sides alternately. This cuts a channel in the material equal to the spacing across the chain with the width defined between the projecting portion 35A of one link and a similar projecting portion of the next alternate link.

In situations where the crop material does open up, the arrangement of FIG. 5 is preferred.

Figure 6:
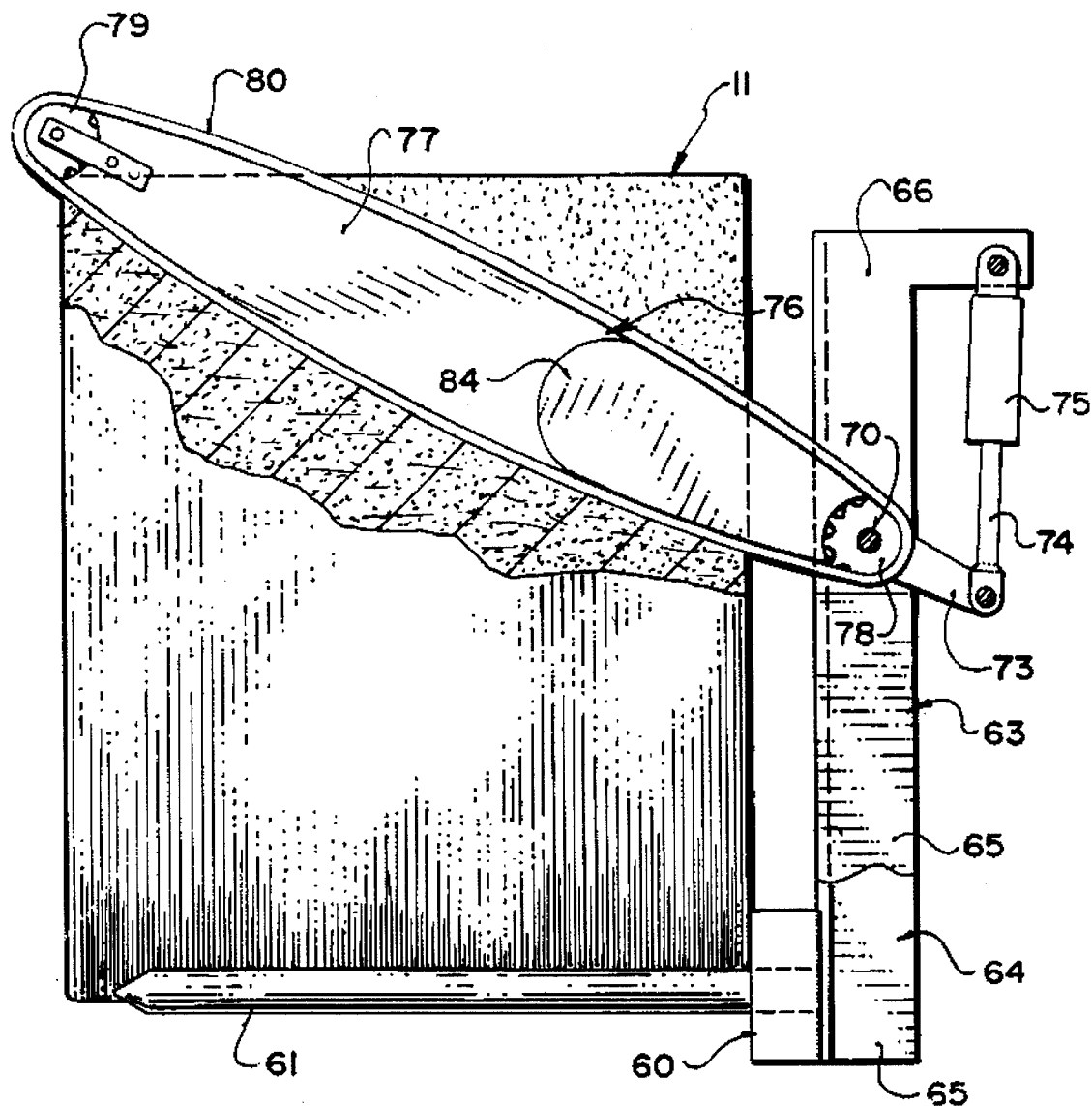
FIG. 6 is a side elevational view of a bale cutting device according to the invention.
Figure 7:
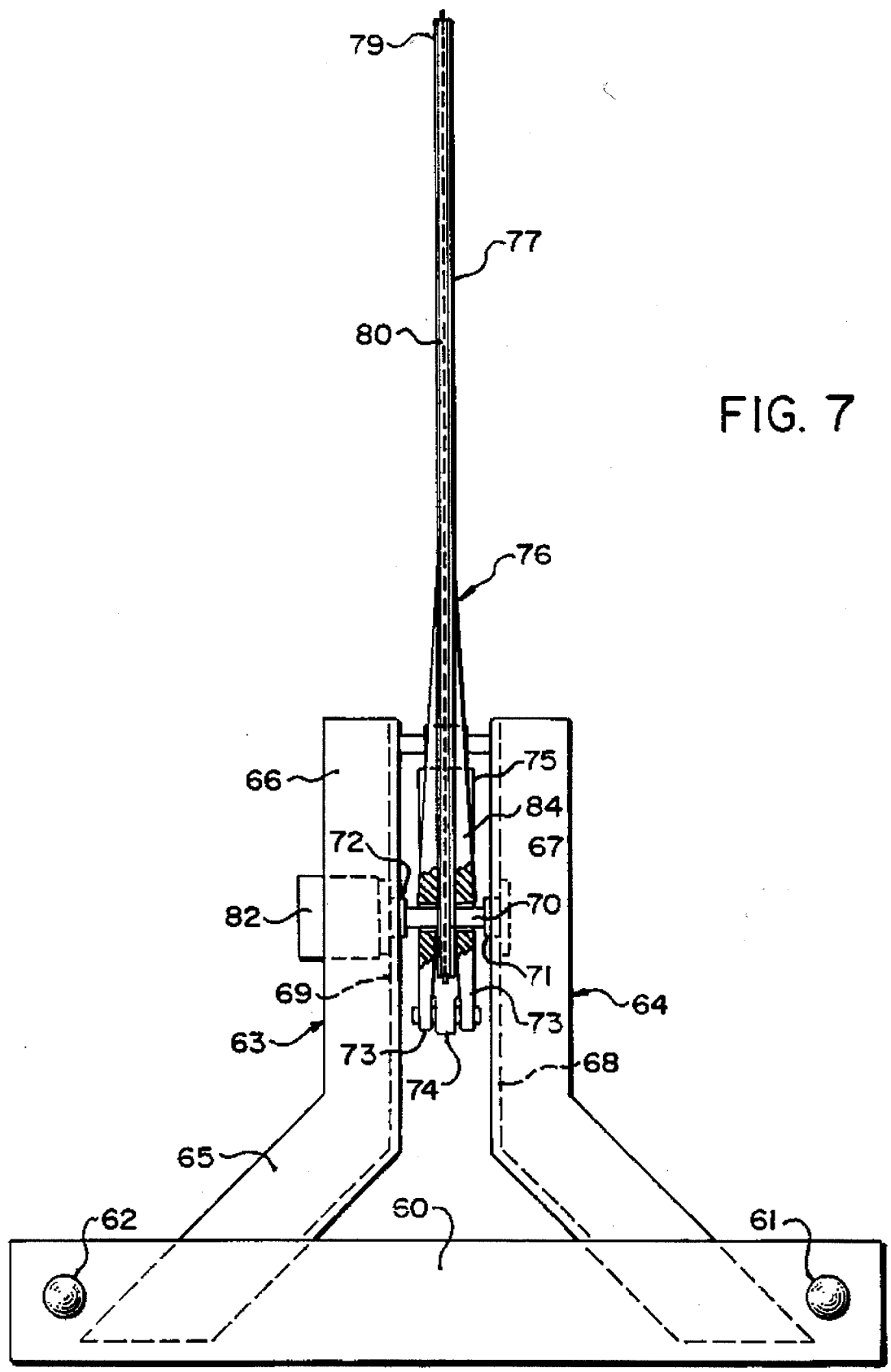
FIG. 7 is a top plan view of the device of FIG. 6.

Turning now to FIGS. 6 and 7 there is shown a particular arrangement of the cutting chain previously described which is mounted for effecting an efficient cutting action on a bale.

The apparatus as shown in FIGS. 6 and 7 therefore provides a horizontal base beam 60 which is arranged for attachment to a suitable lifting system for example the 3 point hitch of a tractor, the front end loader of a tractor or similar lifting system. The mounting arrangement is not shown as this will be well known to one skilled in the art. On a front face of the horizontal beam 60 is provided a pair of bale forks 61 and 62 which extend forwardly from the beam for engaging under a bale so the bale can sit between the forks supported on the forks for a lifting action. The forks can thus slide underneath the bale on either side of the bale in a conventional manner and the forks are a sufficient length to hold the bale supported thereon and pushed to the rear end thereof by forward movement of the beam 60 on the lifting system.

On the rear face of the beam 60 is mounted a pair of upstanding arms 63 and 64 each of which is formed from angle iron so as to define a front plate lying in a vertical plane defined by the rear face of the beam 60 and a strengthening web extending rearwardly therefrom. Each of the arms includes a lower portion 65 extending upwardly and inwardly and a second portion 66 extending vertically upwardly from an inner end of the lower portion. The portion 66 thus defines a channel 67 between the two portions which is open between the webs 68 and 69 of the two arms.

A chain saw system is mounted on the webs 68 and 69 on a transverse shaft 70 extending through bearings 71 and 72 carried on the webs 68 and 69 respectively. The shaft 70 is arranged in a horizontal direction and bridges the channel 67. The shaft carries a lever 73 which extends rearwardly from the webs to a rod 74 of a hydraulic cylinder 75 for actuating upward and downward movement of the lever 73. The lever is attached to a chain support system 76 similar to that of a conventional chain saw. The chain support system includes a blade 77 with a pulley 78 at the rearward end and a second pulley 79 at the outer end. The pulleys guide a cutting chain 80 of the shape and arrangement as previously described. The pulley 78 is driven by a hydraulic motor 82 mounted on one of the arms with the hydraulic motor acting to drive shaft 70 and thus the pulley 78 which is fixedly attached to the shaft. The lever 73 is attached to the blade and to the mounting housing 84 of the chain saw arrangement.

In operation, the chain saw is firstly moved to a raised position standing substantially vertically upwardly from the shaft 70 by actuation of the cylinder 75. In this position the bale can be moved into place on the bale forks by the lifting action as previously described. In this position the bale can be transported to a location at which it is to be cut and spread. The bale is of course arranged with its axis parallel to the forks and above the forks and lying in a plane approximately midway between the forks.

With the bale in place, the hydraulic motor 82 is actuated to commence rotation of the chain about the blade and pulleys. The cylinder 75 is then actuated to drive the blade 77 about the shaft 70 to move it gradually downwardly into contact with a top near edge of the bale. The cutting action is effected as previously described causing cutting of this straw along a vertical plane of cutting action which is the plane containing the axis of the bale so the bale is split into two halves which can fall outwardly to either side of the bale forks by the tension in the straw and by the toppling action of the center of gravity of the two bale parts after the cutting is complete. The length of the blade and thus the distance between the pulley 78 and 79 is arranged such that the pulley 79 passes beyond the outer edge of the bale, The bale is thus cut without engaging the pulley and without carrying material into the pulley in view of the cutting action of the chain as previously described together with the tensioning effect of the straw which pulls the straw away from the cut line.

Figure 8:
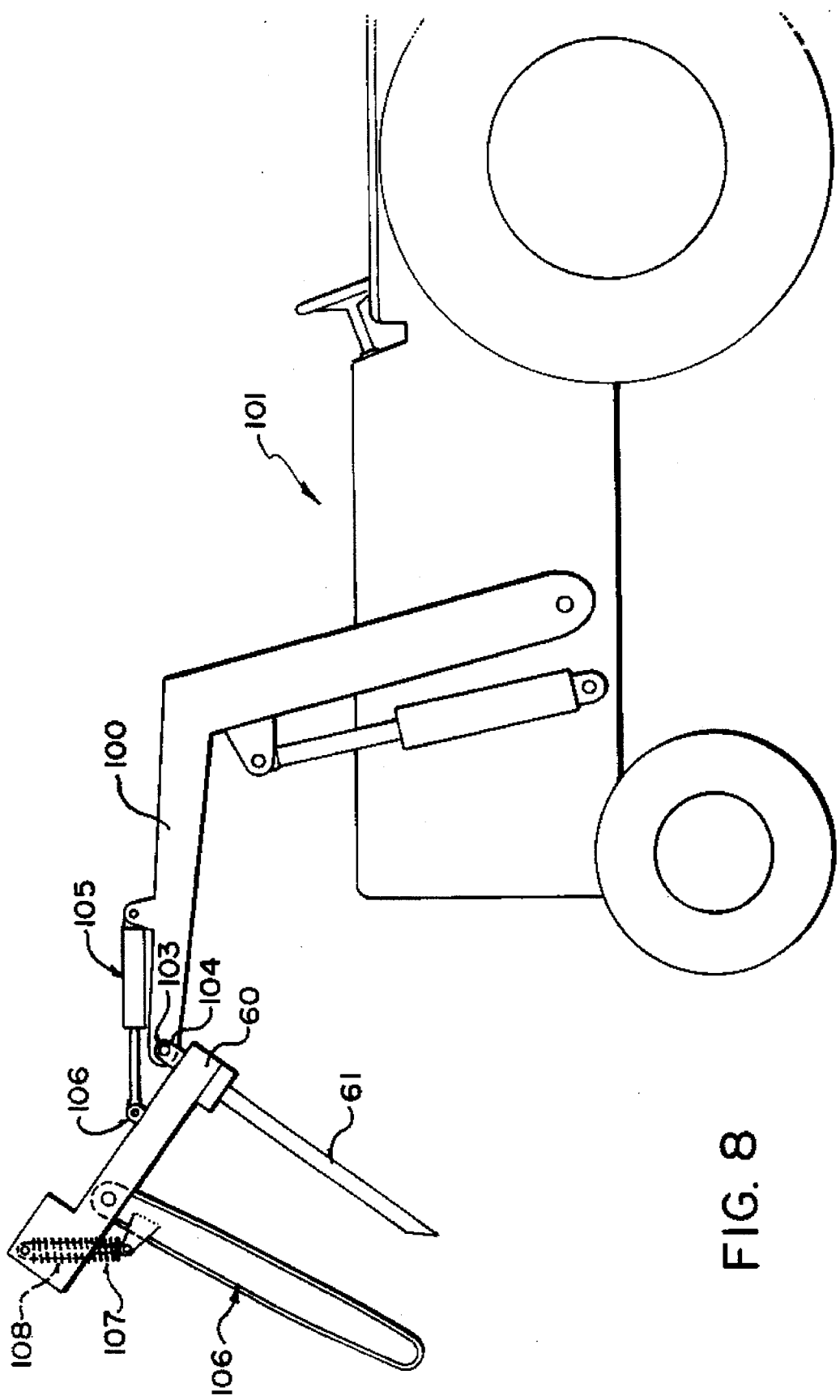
FIG. 8 is a schematic side elevational view of the cutting device of FIGS. 6 and 7 mounted on a tractor.

In FIG. 8 is shown an arrangement in which the mounting frame 60 with the forks 61 is mounted on the front end loader arms 100 of a conventional tractor 101. The arms 100 include pivot pins 103 at a forward end thereof for attachment to a pair of transversely spaced clevises 104 carried on the mounting frame 60. The orientation of the mounting frame relative to the arms is adjusted by a hydraulic cylinder 105 extending from a top of the arms to a similar pair of clevises 106 on the mounting frame at a position upwardly of and inwardly of the clevises 104.

In the arrangement shown in FIG. 8, the downward movement of the chain saw 106 is effected by a spring 107 applying force to the downward pivotal movement of the chain saw 106. The chain saw is retracted from the lowered position to a raised position for commencing a cut by a cylinder 108 mounted at the spring 107 and acting in opposition to the spring 107. Using this arrangement, the hydraulic power from the tractor can be directed wholly to driving the chain saw 106 through its drive motor (not shown in FIG. 8) and the spring provides a downward force required for the cutting action. This avoids dividing the power available from the hydraulic system of the tractor into the two separate elements and the hydraulic action for the retraction of the chain saw 106 is effected when the power to the chain itself is not required.

Figure 9:
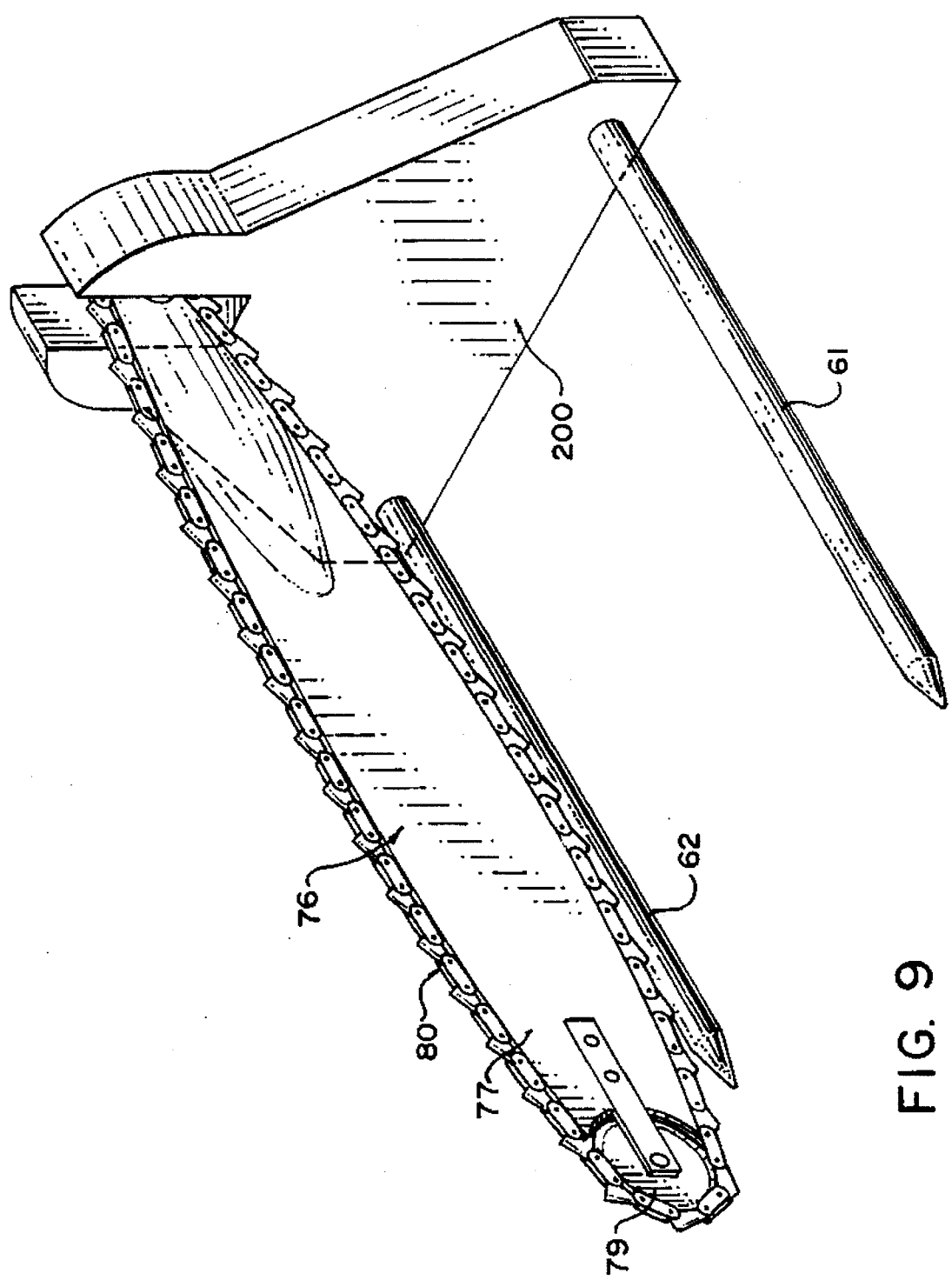
FIG. 9 is an isometric view of a typical example of the bale cutting device of FIG. 6.

FIG. 9 shows a typical arrangement of the bale cutting device of FIG. 6 including the bale spikes 60 and 61 and a housing 200 containing the lifting and drive mechanisms for the cutter device 76.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for cutting a cylindrical bale of a forage material, comprising a tractor having a pair of front lift arms, a bale fork assembly including a mounting frame, means attaching the mounting frame to the lift arms of the tractor for upward and downward movement relative to the tractor from a loading position adjacent the ground to a raised position above the loading position for discharge of a bale after cutting, a pair of bale forks extending forwardly from the mounting frame adjacent a bottom portion thereof for engaging under a bale in the loading position such that the bale when loaded is sitting on the forks, an upstanding support structure positioned generally between the bale forks and extending upwardly therefrom, a cutting chain assembly including a continuous chain, means for driving the chain continuously along its length, pivot mounting means mounting the cutting chain assembly on the upstanding support assembly at a position above and between the bale forks for pivotal movement of the cutting chain assembly in a vertical cutting plane parallel to the bale forks about a pivot axis at right angles to the cutting plane and actuation means for moving the cutting chain assembly in the vertical cutting plane between the forks from a first position above to the forks to a second position depending downwardly between the forks so as to effect cutting of the bale sitting on the forks.

2. The apparatus according to claim 1 wherein the upstanding support comprises a pair of upstanding arms defining an open channel therebetween wherein the cutting chain assembly is mounted on said pivot mounting means bridging the two arms in the channel.

3. The apparatus according to claim 1 wherein said drive means of said cutting chain assembly comprises a hydraulic drive means and wherein said actuation means comprising a hydraulic cylinder acting, on application of hydraulic pressure thereto, to move the cutting chain assembly in a direction from the second position toward the first position and a spring acting, on removal of hydraulic pressure from the cylinder, to move the cutting chain assembly in a direction from the first position toward the second position such that the spring acts to move the cutting chain assembly while hydraulic pressure drives the hydraulic drive means.

4. An apparatus for cutting a cylindrical bale of a forage material, comprising a tractor, a bale fork assembly including a mounting frame, means attaching the mounting frame to the tractor, a pair of bale forks extending forwardly from the mounting frame adjacent a bottom portion thereof for engaging under a bale in the loading position such that the bale when loaded is sitting on the forks, an upstanding support structure positioned generally between the bale forks and extending upwardly therefrom, a cutting chain assembly including a continuous chain and hydraulic drive means for driving the chain continuously along its length, pivot mounting means mounting the cutting chain assembly on the upstanding support assembly at a position above and between the bale forks for pivotal movement of the cutting chain assembly in a vertical cutting plane about a pivot axis which is at right angles to the cutting plane, actuation means for moving the cutting chain assembly in the vertical cutting plane between the forks from a first position above to the forks to a second position depending downwardly between the forks so as to effect cutting of the bale sitting on the forks, said actuation means comprising a hydraulic cylinder acting, on application of hydraulic pressure thereto, to move the cutting chain assembly in a direction from the second position toward the first position and a spring acting, on removal of hydraulic pressure from the cylinder, to move the cutting chain assembly in a direction from the first position toward the second position such that the spring acts to move the cutting chain assembly while hydraulic pressure drives the hydraulic drive means.

5. The apparatus according to claim 4 wherein the upstanding support comprises a pair of upstanding arms defining an open channel therebetween wherein the cutting chain assembly is mounted on said pivot mounting means bridging the two arms in the channel.

* * * * *